United States Patent [19]

Gibbs et al.

[11] Patent Number: 4,843,216
[45] Date of Patent: Jun. 27, 1989

[54] INFRA-RED REWORK STATION

[75] Inventors: Roger H. Gibbs, Redhill; David J. Lowrie, Brighton, both of England

[73] Assignee: PDR Microelectronics Limited, Redhill, England

[21] Appl. No.: 175,842

[22] Filed: Mar. 31, 1988

[51] Int. Cl.$^4$ ............................ F24H 3/00; H05B 1/00
[52] U.S. Cl. ............................ 219/354; 219/358; 250/492.2
[58] Field of Search ............... 219/354, 385, 390, 429, 219/433, 434, 435, 436, 478, 349, 339, 347, 358; 250/493.1, 494.1, 495.1, 503.1, 504 R; 148/DIG. 4; 350/1.2, 1.3, 1.4

[56] References Cited

U.S. PATENT DOCUMENTS

| | | | |
|---|---|---|---|
| 3,959,660 | 5/1976 | Tolliver | 219/349 |
| 4,581,520 | 4/1986 | Vu et al. | 219/354 X |
| 4,707,609 | 11/1987 | Shimamura | 250/492.2 X |
| 4,755,654 | 7/1988 | Crowley et al. | 219/390 X |

Primary Examiner—E. A. Goldberg
Assistant Examiner—M. M. Lateef
Attorney, Agent, or Firm—Chilton, Alix & Van Kirk

[57] ABSTRACT

An infra-red rework station is provided to enable a spot of infra-red energy of controllable size and uniform intensity to be projected onto a component or components requiring rework. The rework station includes a work table including a backheat table upon which the component or components requiring rework are placed, a column which holds in place a lamp/lens unit for projecting a spot of infra-red energy onto the component or components requiring rework, a control unit for controlling the timing and intensity of the projected spot, a backheat control module for controlling the temperature of the backheat table and an external footswitch. Lamp/lens unit includes a lamp housing housing an infra-red lamp, an aperture ring for adjusting an internal iris and a lens housing focussing lenses.

10 Claims, 3 Drawing Sheets

INFRA-RED REWORK STATION

This invention relates to an infra-red rework station. Rework stations allow surface mounted and discrete electronic components to be attached to or removed from their substrate. However, the machines available do not satisfactorily cover the wide range of electronic components now used on epoxy resin boards and ceramic substrates. The rework stations available are dedicated to a small number of similar components from the same family. The areas of rework fall into three main groups:

(1) Work associated with design and development of prototype electronic circuits.
(2) Electronic circuits that have reached a production stage of manufacture but are found to have faulty components.
(3) Electronic circuits that are in service but require modification to rectify a fault.

A component requiring rework may be part of an expensive module, and a rework station provides a means to remove a single component or a small number of components requiring replacement without damaging other components present in the module.

The present invention provides a versatile and adjustable system able to be used on a wide variety of components and circuits requiring rework.

According to the present invention there is provided a rework station comprising a work table and a heating unit mounted at an adjustable height above the work table, the heating unit comprising a source of visible and infra-red radiation, an adjustable aperture and a system of lenses, the aperture and lens system being positioned between the source of infra-red radiation and the work table, the aperture permitting the size of an area of infra-red radiation projected by the heating unit onto a piece requiring rework positioned on the work table to be adjusted, and the lens system providing a substantially uniform temperature within said area.

The aperture and lens system of the present invention thus enable a spot of infra-red radiation of controllable size and uniform intensity to be projected onto the desired component or components without damaging or affecting in any way neighbouring components which do not require rework.

Preferably the lens and aperture system of the rework station comprises a plurality of collector lenses to collect and collimate the radiation from the source of radiation, the adjustable aperture positioned to vary the diameter of the collimated radiation, and a plurality of objective lenses positioned after the aperture to focus the radiation onto the piece requiring rework.

Preferably the rework station also includes a control means connected between an a.c. power source and the source of radiation, to permit the switching between a 'low heat' mode and a 'high heat' mode, these modes being characterised by a low level and high level of intensity of the radiation emitted and subsequently focussed on the piece requiring rework, respectively.

Preferably the control means includes a timing device arranged to maintain the 'high heat' mode for a predetermined and adjustable period of time.

A preferred embodiment of the invention will now be described by way of example only and with reference to the accompanying drawings.

FIG. 1 a perspective view of a rework station according to an embodiment of the present invention.

Figure 1:
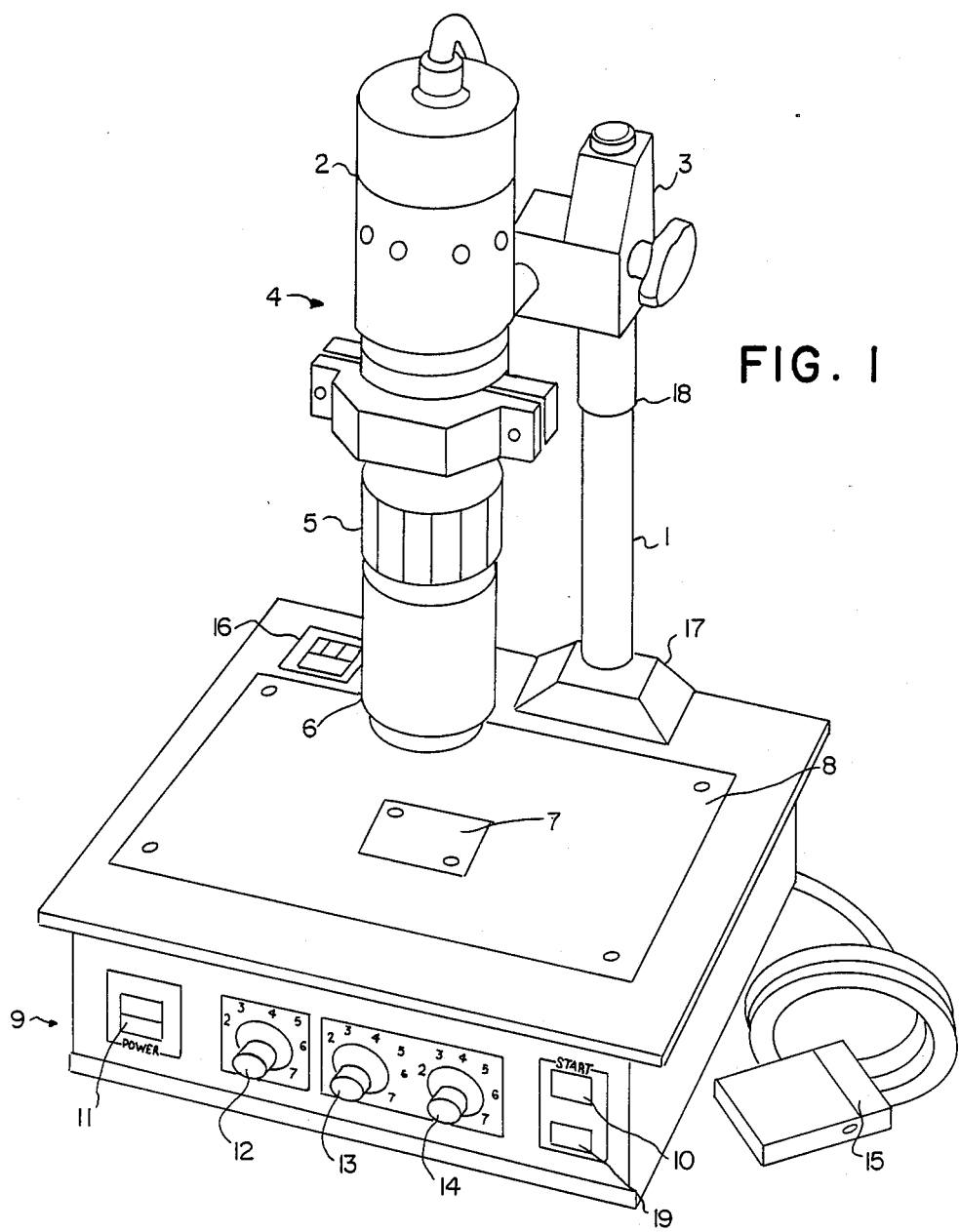

Referring to FIG. 1, the rework station comprises a work table 8 including a backheat table 7 upon which the component or components requiring rework are placed, a column 1 which holds in place a lamp/lens unit 4 for projecting a spot of infra-red energy onto the component or components requiring rework, a control unit 9 for controlling the timing and intensity of the projected spot, a backheat control module 16 for controlling the temperature of the backheat table 7 and an external footswitch 15.

Lamp/lens unit 4 includes a lamp housing 2 housing an infra-red lamp, an aperture ring 5 for adjusting an internal iris and a lens housing 6 housing focussing lenses.

Control unit 9 includes a main power button 11, a low heat dial 12 for controlling the intensity of a spot of infra-red energy initially projected onto the piece requiring rework during a pre-heating mode, a high heat dial 13 and a high heat timer dial 14, for controlling the intensity and duration respectively, of a spot of infra-red energy projected during a high heat mode, a start button 10 to initiate the high heat mode and a stop button 19 to terminate the high heat mode.

To adjust the height of the lamp/lens unit to accomodate larger work pieces, a height adjustment means is provided comprising a clamp 3, to which the lamp/lens unit 4 is attached, mounted on the column 1. Adjustment is achieved by unlocking the clamp 3 and sliding it and the lamp/lens unit up or down the column 1 to a new position. A locking ring 18 provides a safety lock against the lens falling onto the work surface, and consists of two threaded sleeves, one inside the other. The inner sleeve is capable of being firmly locked onto the column 1. Should the clamp 3 fail or be left open, the lamp/lens unit would be supported by the outer sleeve of the friction lock and in turn, the inner sleeve and column. The locking ring 18 may also be used to provide fine height adjustment, by allowing the lamp/lens unit to be supported by the outer sleeve, and turning the outer sleeve to cause it to move up and down the thread of the inner sleeve.

To solder or de-solder components, the work piece is placed on the back heat table 7 of the work table 8 beneath the lens housing 6. The power to the lamp/lens unit is switched on by main button 11 and the low heat dial 12 adjusted to a pre-determined value that represents the desired pre-heat temperature of the workpiece. The spot size is adjusted by rotating the iris ring 5 until the component is fully covered. The visible light radiation allows the operator to see the extent of the spot. The soldering temperature of the component and/or solder within the spot is then pre-set by adjustment of the high heat dial 13 and the operating duration preset by adjustment of the high heat timer dial 14. The high heat mode is then initiated by pressing the high heat start button 10, causing a spot of pre-set intensity to be projected onto the component. After the period of time pre-set by the high heat timer dial, the unit returns to the pre-heat mode and the component may then be removed or placed using a pair of tweezers. The stop button 19 can be depressed to cause the return to the pre-heat mode before the expiration of the pre-set period of time.

The footswitch 15 can be used to override the high heat/pre-heat cycle and to provide continuously a spot of high intensity for so long as the footswitch is depressed. In an alternative embodiment the footswitch can be used to restart the high heat cycle, which then terminates, as normal, following the expiration of the pre-set period of time.

As components mounted on a circuit board frequently have soldered pins or other parts projecting through the circuit board, backheating of these components is clearly desirable to facilitate the de-soldering or soldering process. A typically desirable ambient back heat temperature to be supplied would be 150° C. Backheating of the work piece is provided by the backheat table 7, the temperature of which is controlled by the backheat control module 16. This consists of an adjustable display on which the desired temperature is set and a liquid crystal display or similar which displays the actual temperature of the backheat table as measured by a sensor in the vicinity of the backheat table. Circuitry is provided within the module which compares the actual and desired temperatures of the preheat table and switches on or off the power to the backheat table accordingly. Such modules are commercially available. The backheat control circuit functions independently of the circuitry associated with the control unit 9.

An alternative means may be advantageously used for providing backheat to circuit boards having surface mounted components on both sides. In this case, heat flow to the circuit board and components available for rework mounted on the top surface of the board is impeded by the presence of the components mounted on the lower surface, resting against the backheat table. In fact, to conveniently provide the ambient temperature of 150° C. to the upper components, it may be necessary to raise the temperature of the backheat table to a level where the lower side mounted components in direct contact with the backheat table sustain damage. To overcome this problem, the backheat table means 7 is replaced by an infra-red element mounted just below the surface of the work table 8 where the backheat table was previously provided. The circuit board to be worked on is then suspended, by for example a conventional jig means or the like, above the surface of the table 8 with the area to be worked upon being suspended above the infra-red element. The infra-red element may be of a conventional ceramic type across which a voltage is supplied, of a parabolic shape and dimensions of approximately 120 mm × 60 mm × 10 mm, and may be advantageously connected to a backheat control module 16 of the type used with a backheat table.

Figure 2:
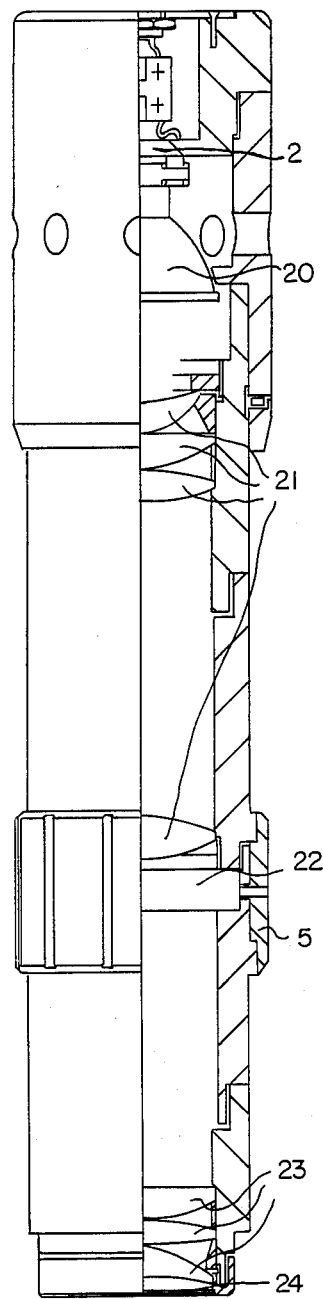
FIG. 2 is a view, partly in cross-section of the lamp and lens housing of FIG. 1.

A shortwave infra-red halogen lamp 20 is housed at the upper end of the lamp/lens unit in the lamp housing 2. The lamp generates a particular-spectral sector of infra red rays in the region of 1.2 microns together with visible light rays. These are passed through a series of convex, concave and parallel coated lenses shown in detail in Fig. 2 to provide a focussed image onto the work piece. The infra-red and visible rays emitted by the lamp are initially refracted through a series of collector lenses 21 that collimate and project the light through a sliding vane iris 22. The aperture size of the iris 22 is adjustable by rotational movement of the iris adjuster ring 5. The net result is to produce a circular column of light energy of adjustable diameter, which is then refracted through a series of objective lenses 23, passed through a 'cold mirror' external filter 24, and focussed onto the working plane. The cold mirror filter is selected so as to stop 95% of the visible light produced by the lamp, enabling 5% of the visible light (red in colour) plus the infra-red light to be projected onto the working plane.

The effect of this arrangement is to allow a clearly delineated spot of infra-red energy to be projected on to the working plane. The diameter of the spot can be varied between 2 mm to 50 mm by adjustment of the iris, with no substantial variation in the temperature of the piece within the spot across its area. Specifically, it is found that it is possible to maintain a constant temperature profile within the spot image to better than 2° C., in a range of 20°-500° C.

The section of the lamp housing 2 containing the objective lenses 23 and cold mirror filter 24 may be constructed as a replaceable unit so as to be replaceable by a similar system of lenses and filter, but having a different focal length. In this manner a variable range of adjustable spot diameters may be provided by a lens system chosen in dependence on the area to be heated, with the added advantage of using on average a larger portion of the collimated beam to produce spot diameter values within the chosen range. Thus, by using the full range of openings of the sliding vane iris spot diameters ranging from 2 mm to 18 mm, 18 mm to 28 mm or 28 mm to 35 mm may be chosen, depending on the optical construction of the lenses 23 for each particular lens system attached to the lower portion of the lamp housing 2.

Figure 3:
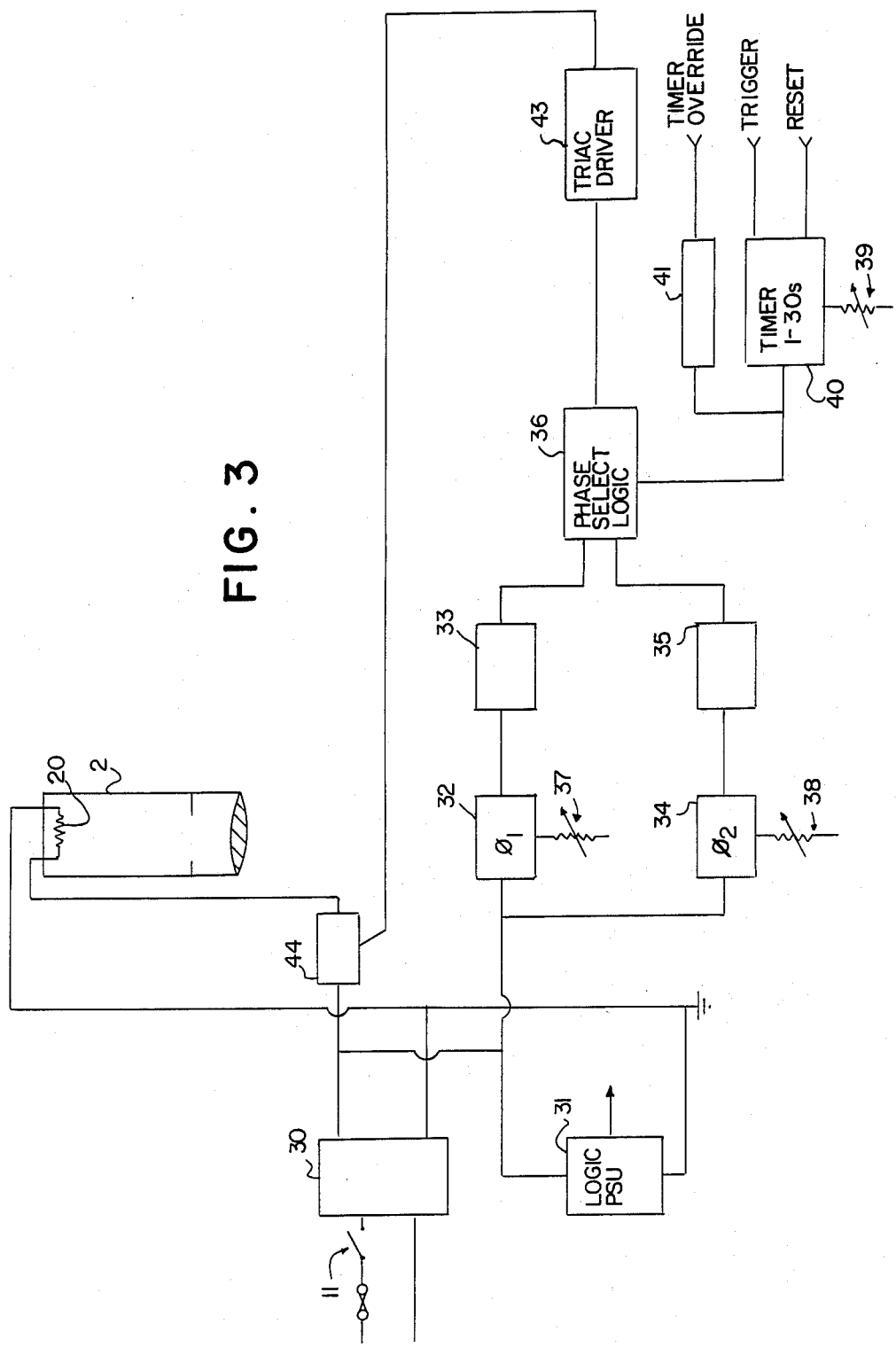
FIG. 3 is a block diagram of the electrical lamp control circuitry of the rework station of FIG. 1.

The circuitry associated with control unit 9 is shown in greater detail in FIG. 3. A transformer 30 with an output of 15 V-24 V, 10A, a.c. is supplied via power switch 11 and supplies power via a triac 44 to the infrared lamp 20. A logic power supply unit 31 is also powered by the transformer 30 and provides a 12 V, 10 mA output supply to the various logic elements of the circuit. The transformer 30 also supplies a reference voltage signal to adjustable phase shifters 32 and 34. The phase shift of the voltage signal associated with these phase shifters is adjusted by variable resistors 37 and 38 which are connected to the high heat dial 13 and low heat dial 12 respectively. The phase shifted voltage outputs from the phase shifters are fed to zero crossing detectors 33 and 35, which provide an output signal upon detection of zero crossing of the phase shifted a.c. signal. Depending on the state of phase select logic 36, one or other of the zero crossing detection signals is fed to a triac driver 43, which provides an output pulse to trigger the triac 44. Depending on the relative phase of the zero crossing of the phase shifted signal to the reference signal, the triac conducts power to the infra-red lamp 20 for variable amounts of the alternating power cycle, and so the intensity of the output of the lamp 20 and hence the projected spot during the pre-heat and high heat cycles can be adjusted accordingly. This method of triac control of an output of a transformer to supply a variable amount of power to a load is well known.

The phase select logic 36 determines which zero crossing detection signals are used on the basis of the input signals received from a gate 41 and a timer 40. In its normal condition logic 36 couples the output of 'low heat' zero crossing detector 35 to triac driver 43. Timer 40 may be activated by a trigger signal from the start switch 10, and provides an output for a predetermined time which causes the phase select logic to supply the zero crossing signal from the detector 33 associated with the high heat mode. The predetermined period of time can be pre-set by adjustment of the variable resistor 39 which is connected to the high heat timer dial 14. At the end of the pre-set period of time the output from the timer 40 reverts to its previous state and the phase select logic switches to again supply the triac driver 43 with the zero crossing signal from the detector 35 associated with the low heat mode. The gate 41 provides a continuous output signal to the phase select logic when supplied with a timer override signal from the footswitch 15, to activate the high heat mode.

If desired a second lamp/lens unit may be provided for further or alternative background heating.

Also a microscope may be attached to the work table for detailed component placement.

What is claimed is:

1. A rework station comprising a work table and a heating unit mounted at an adjustable height above the work table, the heating unit comprising a source of visible and infra-red radiation, an adjustable aperture and a system of lenses, the aperture and lens system being positioned between the source of infra-red radiation and the work table, the aperture permitting the size of an area of infra-red radiation projected by the heating unit onto a piece requiring rework positioned on the work table to be adjusted, and the lens system providing a substantially uniform temperature within said area.

2. A rework station as claimed in claim 1 wherein the lens and aperture system comprises a plurality of collector lenses to collect and collimate the radiation from the source of radiation, the adjustable aperture positioned to vary the diameter of the collimated radiation, and a plurality of objective lenses positioned after the aperture to focus the radiation onto the piece requiring rework.

3. A rework station as claimed in claim 1 wherein the adjustable aperture comprises a continuously variable sliding vane iris.

4. A rework station as claimed in claim 1 wherein a cold mirror filter is inserted between the aperture and lens system, and the work table.

5. A rework station as claimed in claim 1 including a backheat table mounted on the work table to provide an adjustable source of heating to the underside of the piece requiring rework.

6. A rework station as claimed in claim 1 including a control means connected between an a.c. power source and the source of radiation so as to produce an adjustable intensity of radiation emitted by the source of radiation.

7. A rework station as claimed in claim 6 wherein the radiation emitted by the source of radiation is switchable between two different but adjustable levels of intensity.

8. A rework station as claimed in claim 7 including a footswitch arranged to maintain the emission of light at the higher of the two levels of intensity for so long as the footswitch is depressed.

9. A rework station as claimed in claim 6 including a timing device arranged to maintain the emission of light by the radiation source at a predetermined level for a predetermined and adjustable period of time.

10. A rework station as claimed in claim 6 including a backheat table mounted on the work table to provide an adjustable source of heating to the underside of the piece requiring rework.

* * * * *